(12) United States Patent
Li

(10) Patent No.: US 11,987,473 B2
(45) Date of Patent: May 21, 2024

(54) ESCALATOR DEVICE

(71) Applicant: Otis Elevator Company, Farmington, CT (US)

(72) Inventor: Laize Li, Haining (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/965,411

(22) Filed: Oct. 13, 2022

(65) Prior Publication Data

US 2023/0406676 A1 Dec. 21, 2023

(30) Foreign Application Priority Data

May 24, 2022 (CN) .......................... 202210568374.8

(51) Int. Cl.
| | |
|---|---|
| *B66B 25/00* | (2006.01) |
| *B66B 21/04* | (2006.01) |
| *B66B 23/12* | (2006.01) |
| *B66B 23/14* | (2006.01) |
| *G01L 1/16* | (2006.01) |

(52) U.S. Cl.
CPC ............ *B66B 25/006* (2013.01); *B66B 21/04* (2013.01); *B66B 23/12* (2013.01); *B66B 23/14* (2013.01); *G01L 1/16* (2013.01)

(58) Field of Classification Search
CPC ....... B66B 25/00; B66B 29/00; B66B 25/006; B66B 21/04; B66B 23/12; B66B 23/14
USPC ................................................ 198/323, 332
See application file for complete search history.

(56) References Cited

U.S. PATENT DOCUMENTS

| | | | | |
|---|---|---|---|---|
| 3,834,513 | A | | 9/1974 | Miura et al. |
| 5,842,554 | A | * | 12/1998 | Stoxen .................... B66B 25/00 198/322 |
| 2015/0274490 | A1 | * | 10/2015 | Vlad ....................... B66B 23/14 198/321 |

FOREIGN PATENT DOCUMENTS

| | | | | |
|---|---|---|---|---|
| CN | 110015606 | A | 7/2019 | |
| CN | 112919295 | * | 6/2021 | ........... B66B 29/005 |
| JP | 6462908 | * | 1/2019 | ............. B66B 23/12 |

OTHER PUBLICATIONS

European Search Report for Application No. 22210540.5, Issued Nov. 29, 2023, 6 Pages.

* cited by examiner

*Primary Examiner* — James R Bidwell
(74) *Attorney, Agent, or Firm* — CANTOR COLBURN LLP

(57) ABSTRACT

An escalator device includes a plurality of steps, wherein both sides of each step are provided with mounting portions and step wheels rotatably mounted to the mounting portions; step wheel guide rails fixedly arranged on both sides of the escalator device for guiding the step wheels of each step, during the operation of the escalator device, the step wheels of each step move along the step wheel guide rails on both sides respectively; and anti-detachment guide rails arranged on both sides of the escalator device, during the movement of the step wheels of each step along the step wheel guide rails on both sides respectively, the anti-detachment guide rails are located above and spaced apart from anti-detachment portions of each step, a piezoelectric sensor is provided on the surface of the anti-detachment guide rail facing the anti-detachment portion.

12 Claims, 6 Drawing Sheets

ESCALATOR DEVICE

FOREIGN PRIORITY

This application claims priority to Chinese Patent Application No. 202210568374.8, filed May 24, 2022, and all the benefits accruing therefrom under 35 U.S.C. § 119, the contents of which in its entirety are herein incorporated by reference.

FIELD OF THE INVENTION

The present invention relates to the field of escalator devices, in particular to a device for preventing steps from rising in an escalator device.

BACKGROUND OF THE INVENTION

An escalator device comprises a plurality of steps or stairs. The two sides of the steps are respectively connected to the driving chains for cyclic movement. The step further comprises a pair of step wheels that move along the step wheel guide rails on both sides of the escalator device respectively. When there is a foreign object in the step wheel guide rails, the step wheels will be lifted as they pass therethrough. In addition, in the arc-shaped segment at the upper end of the escalator, i.e., the transition segment connecting the higher-level ground and the inclined climbing segment of the escalator, the adjacent steps will gradually switch from the high-and-low position to the flush position. And during this process, if a foreign object is stuck between two adjacent steps, it may also cause the steps to rise.

In order to monitor and prevent the rise of the steps, the existing escalator systems are provided with a lever-type shield located above the step wheels in the arc-shaped segment. One end of the lever-type shield is pivotable, which will contact and trigger the pivot of the lever-type shield when the step wheels are lifted. For the lever-type shield, the coverage thereof is limited and the trigger force thereof varies from area to area.

SUMMARY OF THE INVENTION

The objective of the present application is to solve or at least alleviate the problems existing in the prior art.

According to one aspect, an escalator device is provided, which comprises: a plurality of steps, wherein both sides of each step are provided with mounting portions and step wheels rotatably mounted to the mounting portions; step wheel guide rails fixedly arranged on both sides of the escalator device for guiding the step wheels of each step, wherein during operation of the escalator device, the step wheels of each step move along the step wheel guide rails on both sides respectively; and anti-detachment guide rails arranged on both sides of the escalator device, wherein during the movement of the step wheels of each step along the step wheel guide rails on both sides respectively, the anti-detachment guide rails are located above and spaced apart from anti-detachment portions of each step; wherein, a piezoelectric sensor is provided on the surface of the anti-detachment guide rail facing the anti-detachment portion.

Optionally, in an embodiment of the escalator device, the piezoelectric sensor is elongated and arranged along at least a part of segments of the anti-detachment guide rail.

Optionally, the escalator device further comprises a cover plate covering the piezoelectric sensor, wherein a first end of the cover plate is connected to the anti-detachment guide rail, and a second end of the cover plate is a free end and covers the piezoelectric sensor.

Optionally, in an embodiment of the escalator device, the anti-detachment guide rail comprises an upper arc-shaped segment, a lower arc-shaped segment and a middle straight segment, wherein the piezoelectric sensor and the cover plate are arranged along the entire upper arc-shaped segment and the entire lower arc-shaped segment of the anti-detachment guide rails on both sides.

Optionally, in an embodiment of the escalator device, the piezoelectric sensor and the cover plate are also arranged along the entire middle straight segment of the anti-detachment guide rails on both sides.

Optionally, in an embodiment of the escalator device, the anti-detachment portion is an anti-detachment hook extending from the mounting portion.

Optionally, in an embodiment of the escalator device, the anti-detachment hook is L-shaped, and comprises a vertical segment extending downward from the mounting portion and a horizontal segment extending from the vertical segment toward a direction away from the step wheel.

Optionally, in an embodiment of the escalator device, the anti-detachment guide rail comprises a horizontal portion located above the horizontal segment of the anti-detachment hook, and the piezoelectric sensor is arranged along the horizontal portion on the lower surface of the horizontal portion.

Optionally, in an embodiment of the escalator device, a gap in a range of 1 mm-5 mm is provided between the cover plate covering the piezoelectric sensor and the horizontal segment of the anti-detachment hook.

Optionally, in an embodiment of the escalator device, the preset pressure of the piezoelectric sensor is in a range of 20 kg-30 kg.

Optionally, in an embodiment of the escalator device, the mounting portion is located at the rear side of each step, and the front side of each step is further connected to the driving chain.

Optionally, in an embodiment of the escalator device, the escalator device further comprises a controller coupled to the piezoelectric sensor, wherein the controller shuts down the escalator device when the piezoelectric sensor is triggered.

The escalator device according to the embodiments of the present invention can more accurately sense the rise of the steps during the entire step movement process.

BRIEF DESCRIPTION OF THE DRAWINGS

With reference to the accompanying drawings, the disclosure of the present application will become easier to understand. Those skilled in the art would easily understand that these drawings are for the purpose of illustration, and are not intended to limit the protection scope of the present application. In addition, in the figures, similar numerals are used to denote similar components, where.

DETAILED DESCRIPTION OF EMBODIMENT(S) OF THE INVENTION

Figure 1:
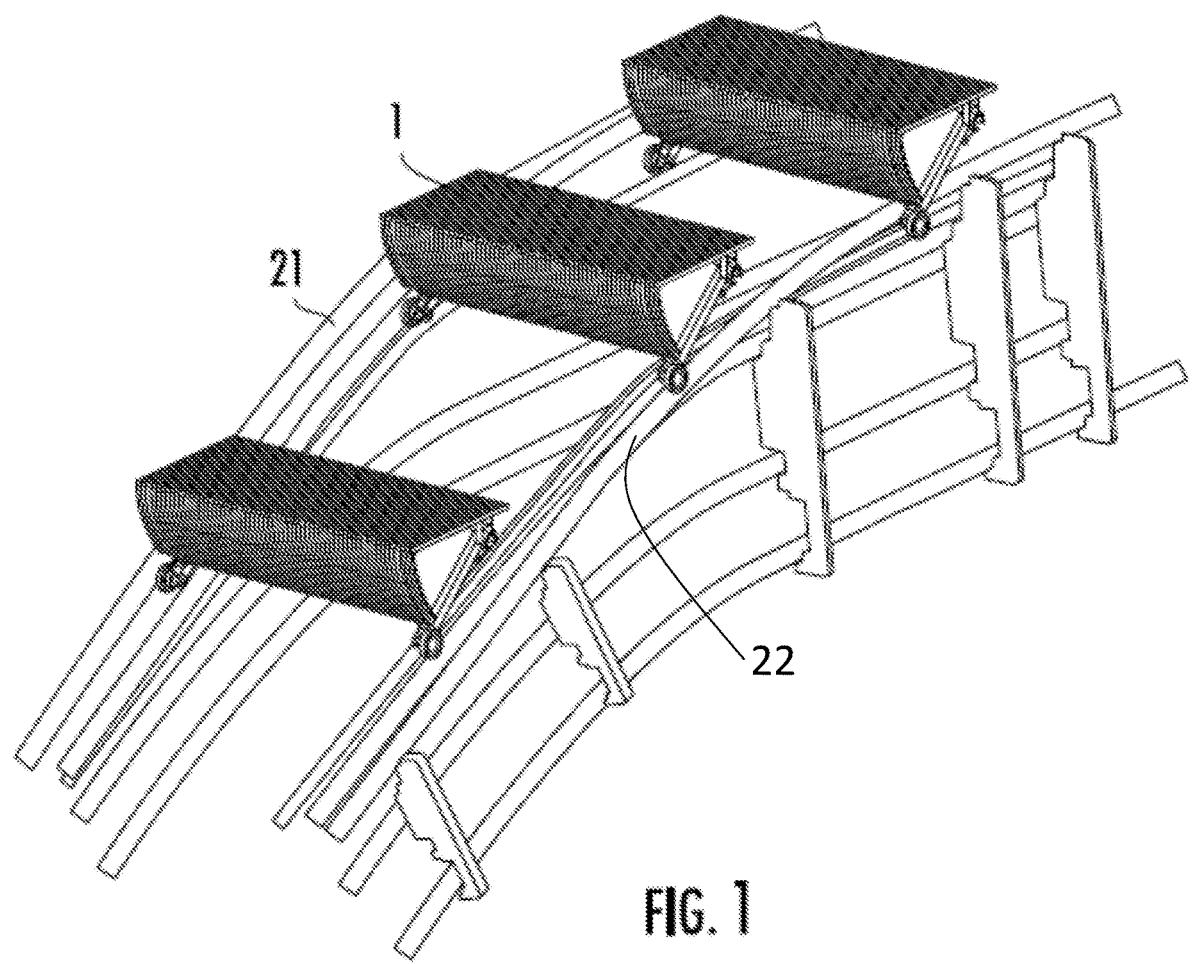
FIG. 1 shows a perspective view of an escalator device according to an embodiment of the present invention.
Figure 2:
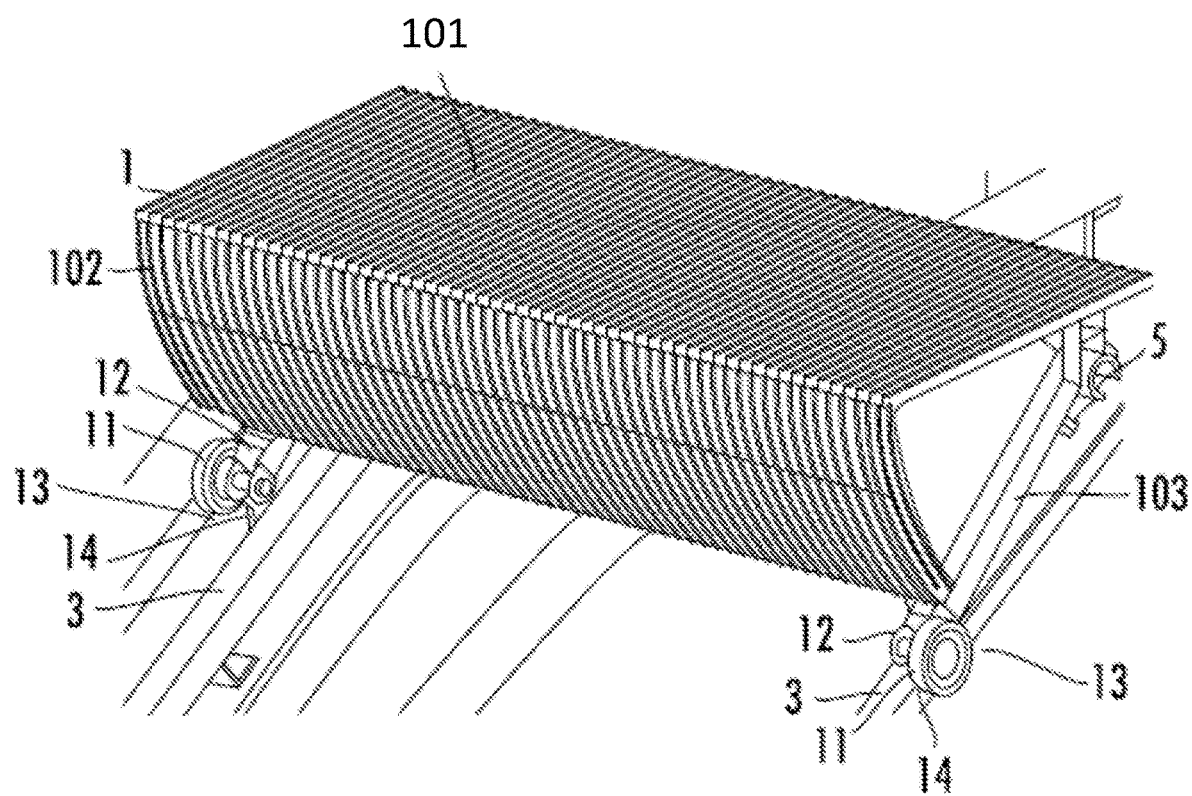
FIG. 2 shows a partial enlarged view of the escalator device of FIG. 1.
Figure 3:
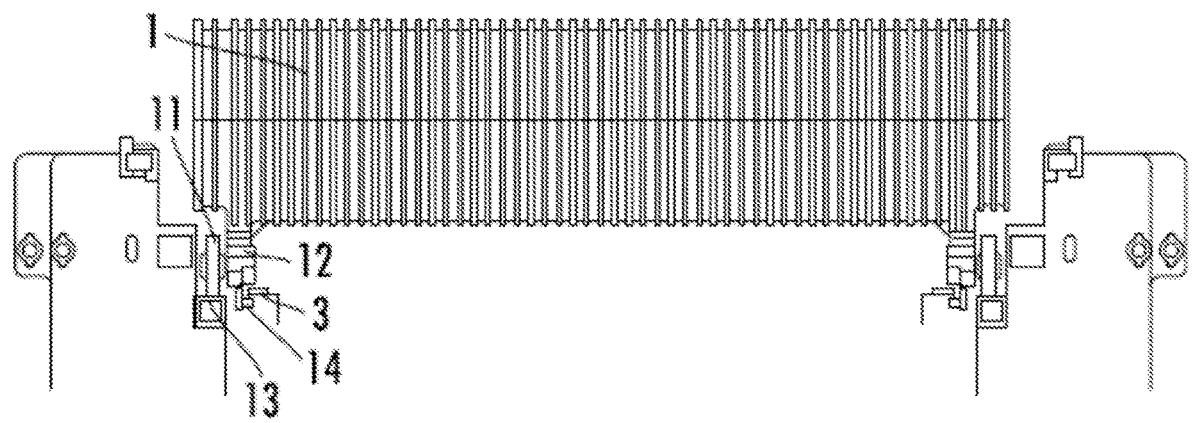
FIG. 3 shows a front view of an escalator device according to an embodiment of the present invention.
Figure 4:
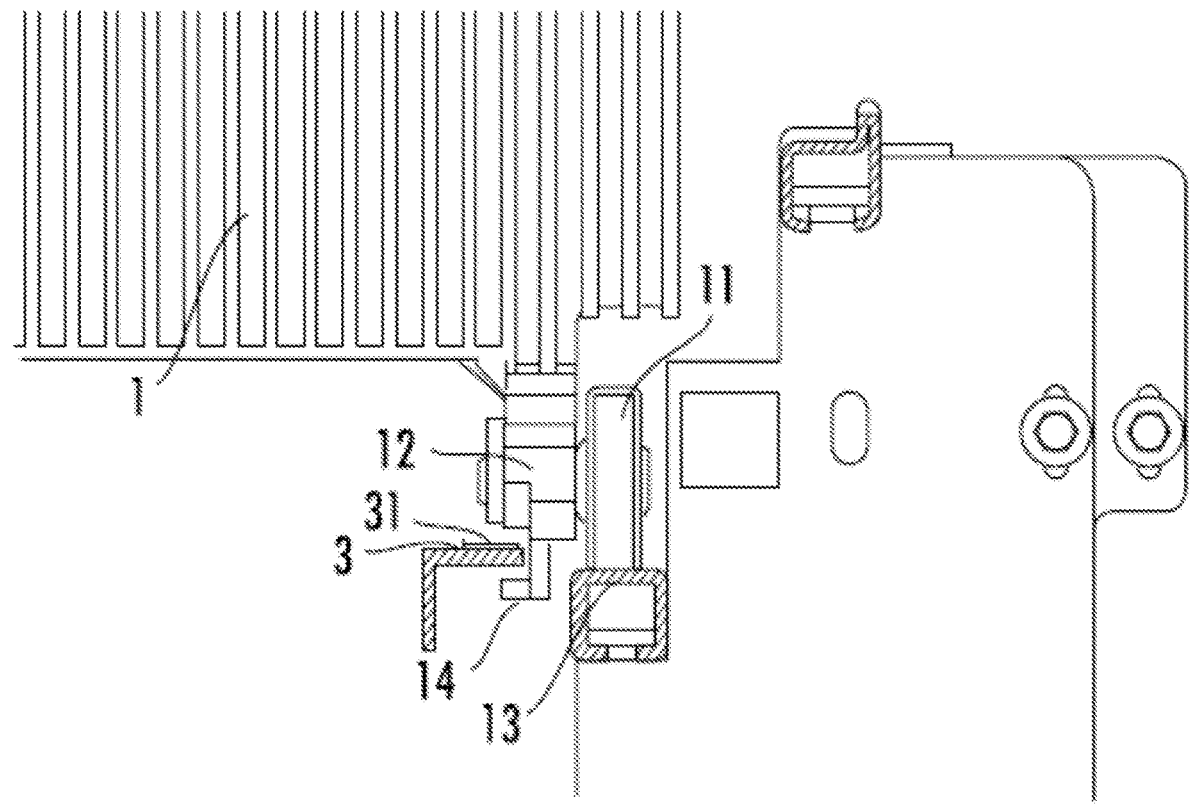
FIG. 4 shows a partial enlarged view of the escalator device of FIG. 3.

It is easy to understand that, according to the technical solutions of the present invention, without changing the essential spirit of the present invention, those skilled in the art can propose multiple replaceable structural modes and implementations. Therefore, the specific embodiments and accompanying drawings below are only exemplary descriptions of the technical solutions of the present invention, and should not be regarded as the entirety of the present invention or as limitations or restrictions on the technical solutions of the present invention.

Orientation terms such as upper, lower, left, right, front, rear, front, back, top, bottom, etc. mentioned or possibly mentioned in this specification are defined relative to the configurations illustrated in the respective drawings. They are relative concepts, so they may change accordingly according to their different locations and different states of use. Therefore, these and other orientation terms shall not be construed as restrictive terms.

An escalator device according to an embodiment of the present invention is described with reference to FIGS. 1 to 5. It should be understood that, for the sake of clarity, in the drawings, some steps and some other components of the escalator device according to the embodiment are omitted in order to better illustrate the components related to the escalator device according to the embodiment of the present invention. The escalator device according to the embodiment of the present invention comprises: a plurality of steps 1, wherein both sides of each step 1 are provided with mounting portions 12 and step wheels 11 (also referred to as auxiliary wheels) rotatably mounted to the mounting portions 12; and step wheel guide rails 13 (most clearly shown in FIGS. 3 and 4) fixedly arranged on both sides 21, 22 of the escalator device for guiding the step wheels 11 of each step. During the operation of the escalator device, the step wheels 11 of each step 1 move along the step wheel guide rails 13 on both sides, respectively. The plurality of steps 1 may comprise a horizontal portion 101, a curved portion 102 extending in a curved manner downward from the rear side of the horizontal portion 101, and a structural bracket 103 connected between the front side of the horizontal portion 101 and the lower side of the curved portion 102. In some embodiments, the mounting portions 12 may extend downward from the bottoms of both sides of the curved portion 102, and the step wheels 11 are rotatably mounted to the mounting portions 12 through wheel axles. In addition, the front end of the structural bracket 103 has C-shaped receiving portions to engage with the wheels on the driving chains on both sides 21, 22 of the escalator device, thereby driving the cyclic movement of the entire step 1. As mentioned in the background of the invention, when there is a foreign object on the step wheel guide rails 13, or when there is a foreign object between two adjacent steps in the upper arc-shaped segment of the escalator device, or due to other factors, the step 1 may be subjected to a lifting force. Therefore, the escalator device according to the embodiment of the present invention further comprises anti-detachment guide rails 3 arranged on both sides of the escalator. During the movement of the step wheels of each step along the step wheel guide rails on both sides respectively, the anti-detachment guide rails 3 are located above and spaced apart from anti-detachment portions 14 of each step. When the step 1 is lifted due to the above or other factors, the anti-detachment guide rails 3 engage with the anti-detachment portions 14 of the lifted step to prevent it from continuing to rise and thus disengage. On the other hand, a piezoelectric sensor 31 is provided on the surface of the anti-detachment guide rail 3 facing the anti-detachment portion to sense the rise of the step 1.

Figure 5:
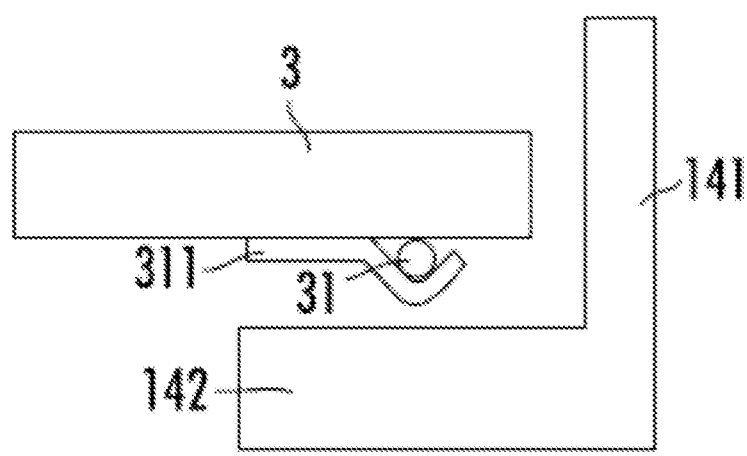
FIG. 5 shows a partial enlarged view of the piezoelectric sensor portion of the escalator device of FIG. 3.
Figure 6:
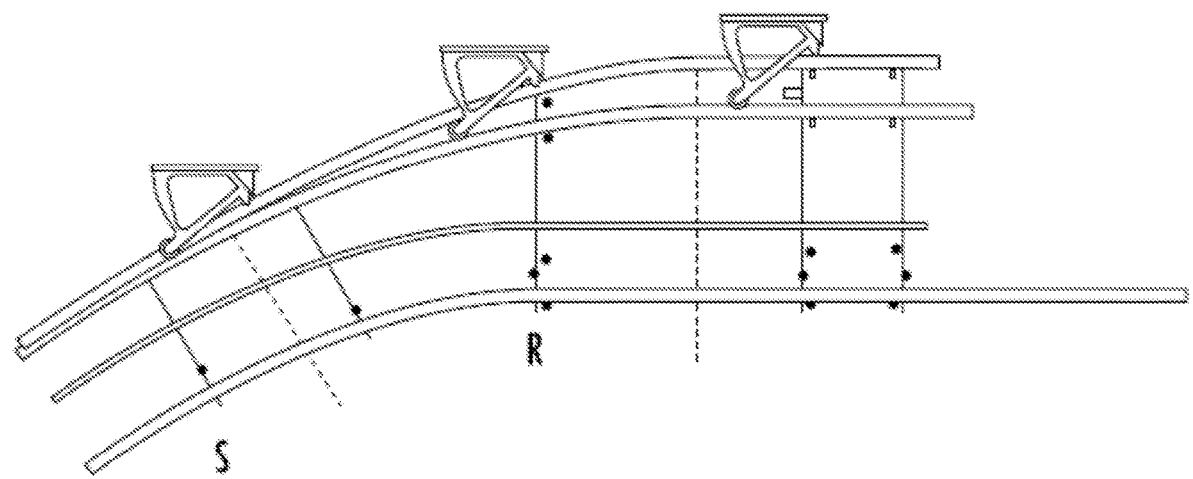
FIG. 6 shows a side view of an escalator device according to an embodiment of the present invention.

In some embodiments, the piezoelectric sensor 31 is elongated, and is arranged along the anti-detachment guide rail 3 to cover at least a part of the segment(s) of the anti-detachment guide rail 3, such as the segment(s) where the rise of steps is most likely to occur. In some embodiments, as shown in FIG. 5, the cover plate 311 is covered on the piezoelectric sensor 31. The first end (the left end in the figure) of the cover plate 311 is connected to the anti-detachment guide rail, for example, connected to the anti-detachment guide rail by welding, and the second end of the cover plate 311 is a free end and covers the piezoelectric sensor 31. By arranging the cover plate 311, on one hand, the piezoelectric sensor can be fixed, and on the other hand, the piezoelectric sensor can be protected, thereby preventing the piezoelectric sensor 31 from being damaged due to friction between the step and the piezoelectric sensor 31 when the step is slightly lifted. In alternative embodiments, other means may be used to secure and protect the piezoelectric sensor, or the cover plate 311 may be of other shapes. With continued reference to FIG. 6, the escalator device generally comprises a straight climbing segment S, a lower curved segment (not shown, similar to the upper curved segment R) between the straight climbing segment S and the lower platform, and an upper curved segment R between the straight climbing segment S and the upper platform. The anti-detachment guide rail 3 may have an upper arc-shaped segment, a middle straight segment and a lower arc-shaped segment corresponding thereto. In some embodiments, the elongated piezoelectric sensor 31 and the cover plate 311 may be arranged along the entire upper arc-shaped segment and the entire lower arc-shaped segment of the anti-detachment guide rails on both sides. Since the movement trail of the step 1 at the upper arc-shaped segment and the entire lower arc-shaped segment is arc-shaped, it is easy to cause the rise of the step 1. Therefore, the arrangement of elongated piezoelectric sensor 31 throughout the entire upper arc-shaped segment and the entire lower arc-shaped segment can facilitate the sensing of a step-lifting condition anywhere in these segments. In other embodiments, the elongated piezoelectric sensor 31 and the cover plate 311 may also be arranged only on one side, or only cover a part of the upper arc-shaped segment and the lower arc-shaped segment. In some embodiments, the surface of the middle straight segment of the anti-detachment guide rail facing the anti-detachment hook is also provided with a piezoelectric sensor, so that the step-lifting condition of the entire cycle of the step 1 can be sensed. In some embodiments, the elongated piezoelectric sensor 31 and the cover plate 311 are arranged along the entire upper arc-shaped segment, the middle straight segment and the lower arc-shaped segment of the anti-detachment guide rails on both sides, i.e., fully covering the entire anti-detachment guide rails on both sides. In some embodiments, the elongated piezoelectric sensor 31 can also sense the specific location where the step-lifting condition occurs.

In the illustrated embodiment, the anti-detachment portions 14 of the plurality of steps 1 of the escalator device according to the present invention are anti-detachment hooks extending from the mounting portions 12. In alternative embodiments, the anti-detachment portion 14 can be any suitable part on both sides of the step, for example, the step wheel 11 can also be used as the anti-detachment portion. In this case, the anti-detachment guide rails 3 are arranged on the upper side of the step wheel 11 at a certain interval. In the illustrated embodiment, the anti-detachment hook of the escalator device according to the present invention is substantially L-shaped, comprising a vertical segment 141 extending downward from the mounting portion 12 and a horizontal segment 142 extending from the lower end of the vertical segment to a direction away from the step wheel. The anti-detachment hook extending downward from the mounting portion 12 can be staggered from other parts of the step 1 so as not to interfere with each other, thereby providing an arrangement space for the anti-detachment guide rails 3. In alternative embodiments, the anti-detachment hook may have other shapes or be provided at other suitable locations.

In some embodiments, the anti-detachment guide rail 3 comprises a horizontal portion located above the horizontal segment of the anti-detachment hook, and the piezoelectric sensor 31 is arranged along the horizontal portion of the anti-detachment guide rail 3 on the lower surface of the horizontal portion. In some embodiments, a gap in the range of 1 mm-5 mm is provided between the cover plate 311 covering the piezoelectric sensor 31 and the horizontal segment 142 of the anti-detachment hook. In some embodiments, a gap in the range of 2 mm-4 mm is provided between the piezoelectric sensor 31 and the horizontal segment of the anti-detachment hook. In alternative embodiments, a larger gap may be provided between the piezoelectric sensor 31 and the horizontal segment of the anti-detachment hook. In some embodiments, the preset pressure of the piezoelectric sensor may be in the range of 20 kg-30 kg, which is the minimum pressure at which the piezoelectric sensor will be triggered. In alternative embodiments, the preset pressure of the piezoelectric sensor may be greater or smaller. In some embodiments, the escalator device further comprises a controller coupled to the piezoelectric sensor. The controller performs a control operation when the piezoelectric sensor is triggered, such as shutting down the escalator device to avoid a safety accident occurred due to the rise of the steps.

The escalator device according to the embodiments of the present invention can more accurately sense the rise of the steps during the entire step movement process. Compared with the existing step anti-detachment and sensing devices, the step sensing device according to the embodiments of the present invention can provide sensing in a part of the segments or the entire process of the step movement, and is convenient for installation and retrofitting of the existing escalators. Piezoelectric sensors are highly sensitive and can be provided with preset sensed pressure that is consistent along a part of the segments or the entire process of the step movement.

The specific embodiments of the present application described above are merely intended to describe the principles of the present application more clearly, wherein various components are clearly shown or described to facilitate the understanding of the principles of the present invention. Those skilled in the art may, without departing from the scope of the present application, make various modifications or changes to the present application. Therefore, it should be understood that these modifications or changes should be included within the scope of patent protection of the present application.

What is claimed is:

1. An escalator device, comprising:
    a plurality of steps, wherein both sides of each step are provided with mounting portions and step wheels rotatably mounted to the mounting portions;
    step wheel guide rails fixedly arranged on both sides of the escalator device for guiding the step wheels of each step, wherein during operation of the escalator device, the step wheels of each step move along the step wheel guide rails on both sides respectively; and
    anti-detachment guide rails arranged on both sides of the escalator device, wherein during movement of the step wheels of each step along the step wheel guide rails on both sides respectively, the anti-detachment guide rails are located above and spaced apart from anti-detachment portions of each step;
    wherein a piezoelectric sensors is provided on the surface of the anti-detachment guide rail facing the anti-detachment portion.

2. The escalator device according to claim 1, wherein the piezoelectric sensor is elongated and arranged along at least a part of segments of the anti-detachment guide rail.

3. The escalator device according to claim 2, further comprising a cover plate covering the piezoelectric sensor, wherein a first end of the cover plate is connected to the anti-detachment guide rail, and a second end of the cover plate is a free end and covers the piezoelectric sensor.

4. The escalator device according to claim 3, wherein the anti-detachment guide rail comprises an upper arc-shaped segment, a lower arc-shaped segment and a middle straight segment, and the piezoelectric sensors and the cover plates are arranged along the entire upper arc-shaped segment and the entire lower arc-shaped segment of the anti-detachment guide rails on both sides.

5. The escalator device according to claim 4, wherein the piezoelectric sensor and the cover plate are also arranged along the entire middle straight segment of the anti-detachment guide rails on both sides.

6. The escalator device according to claim 1, wherein the anti-detachment portion is an anti-detachment hook extending from the mounting portion.

7. The escalator device according to claim 6, wherein the anti-detachment hook is L-shaped, and comprises a vertical segment extending downward from the mounting portion and a horizontal segment extending from the vertical segment in a direction away from the step wheel.

8. The escalator device according to claim 7, wherein the anti-detachment guide rail comprises a horizontal portion located above the horizontal segment of the anti-detachment hook, and the piezoelectric sensor is arranged along the horizontal portion on the lower surface of the horizontal portion.

9. The escalator device according to claim 3, wherein a gap in a range of 1 mm-5 mm is provided between the cover plate covering the piezoelectric sensor and the horizontal segment of the anti-detachment hook extending from the mounting portion.

10. The escalator device according to claim 1, wherein a preset pressure of the piezoelectric sensor is in a range of 20 kg-30 kg.

11. The escalator device according to claim 1, wherein the mounting portion is located at rear side of each step, and front side of each step is further connected to a driving chain.

12. The escalator device according to claim 1, wherein the escalator device further comprises a controller coupled to the piezoelectric sensor, and the controller shuts down the escalator device when the piezoelectric sensor is triggered.

\* \* \* \* \*